July 1, 1969 — J. A. BRADFORD — 3,452,448
APPARATUS FOR DRYING FRUIT
Filed Oct. 9, 1967 — Sheet 1 of 3
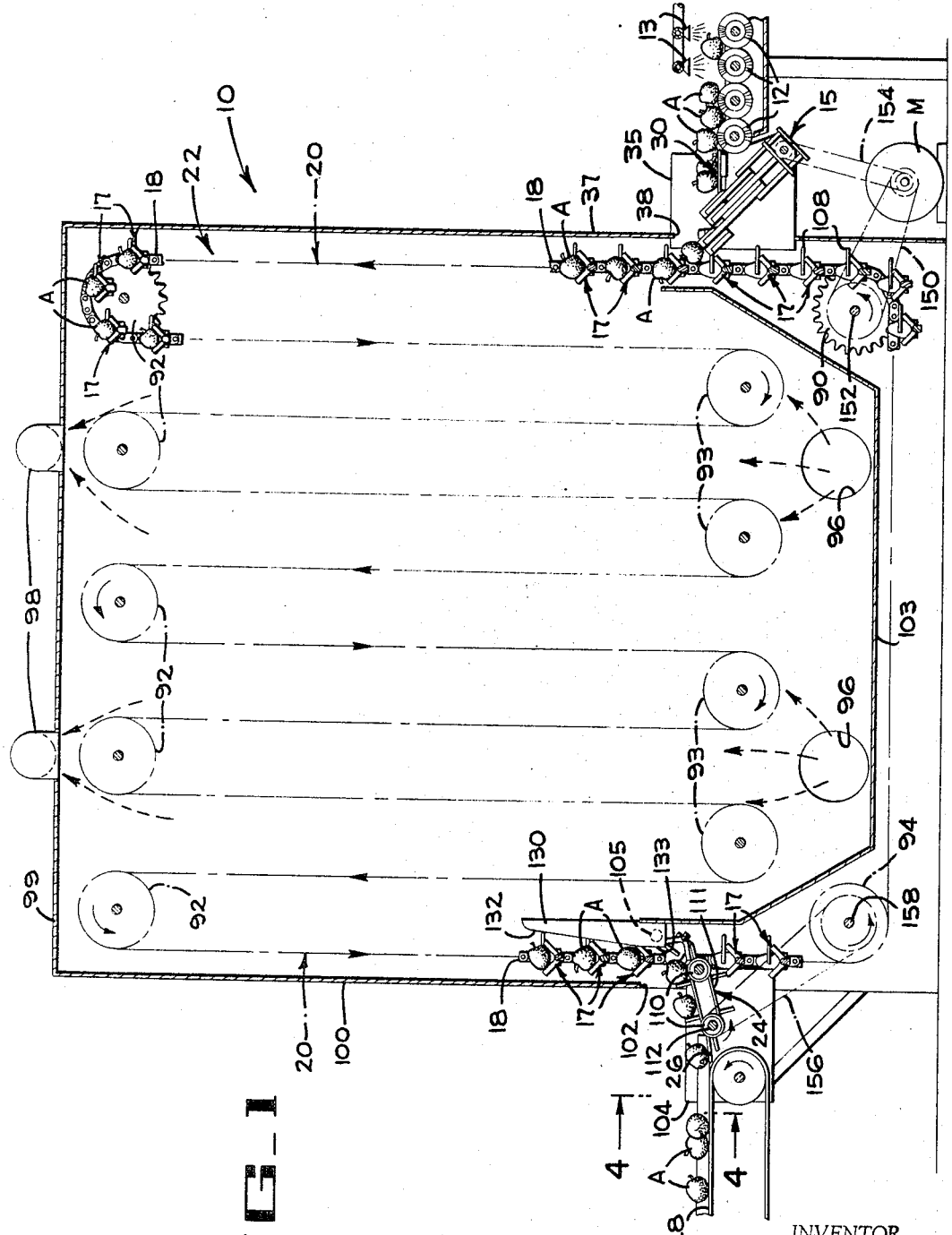
FIG_1
INVENTOR.
JACK A. BRADFORD
BY F. W. Anderson
C. E. Tripp
ATTORNEYS

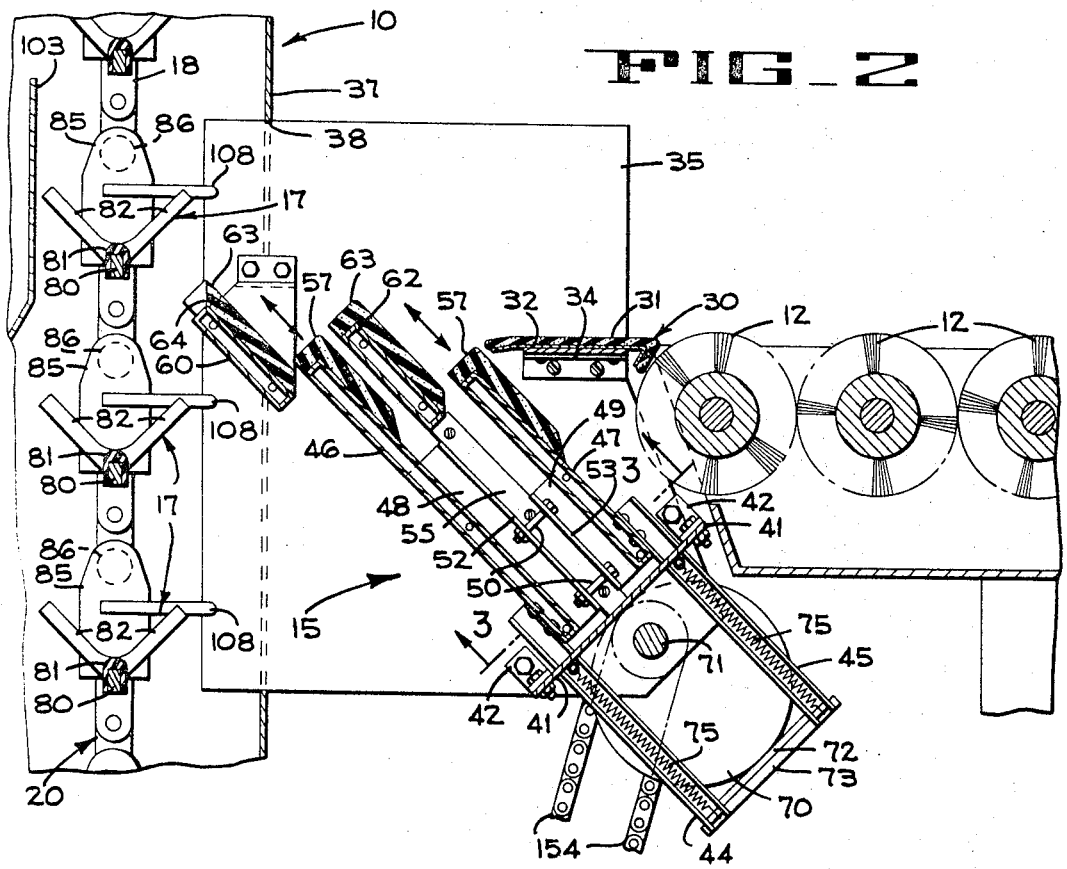
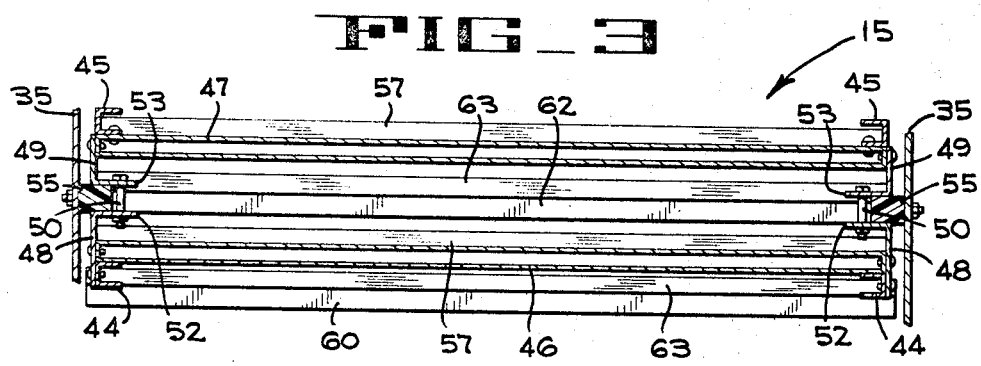

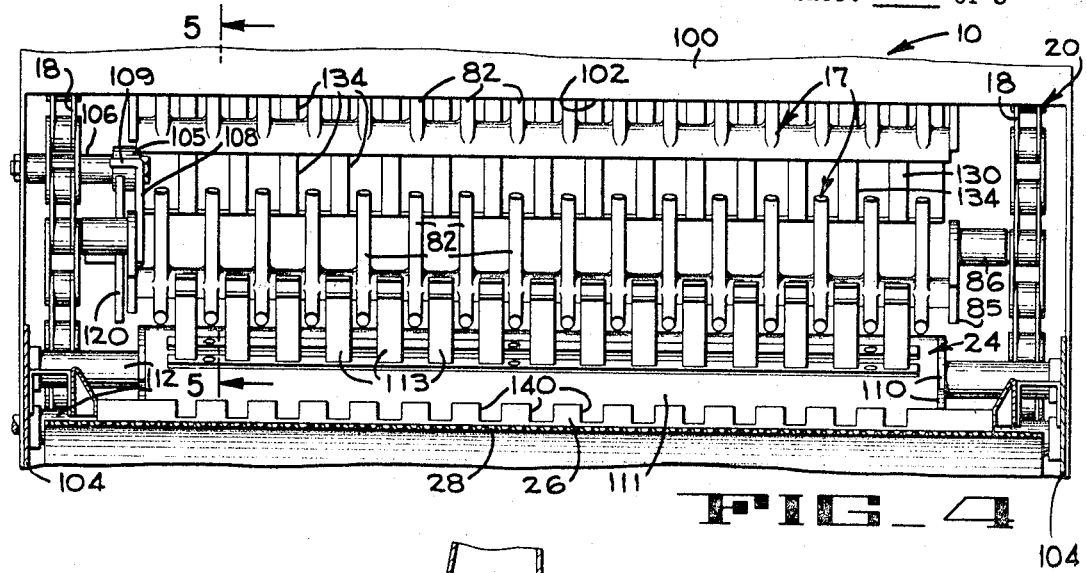
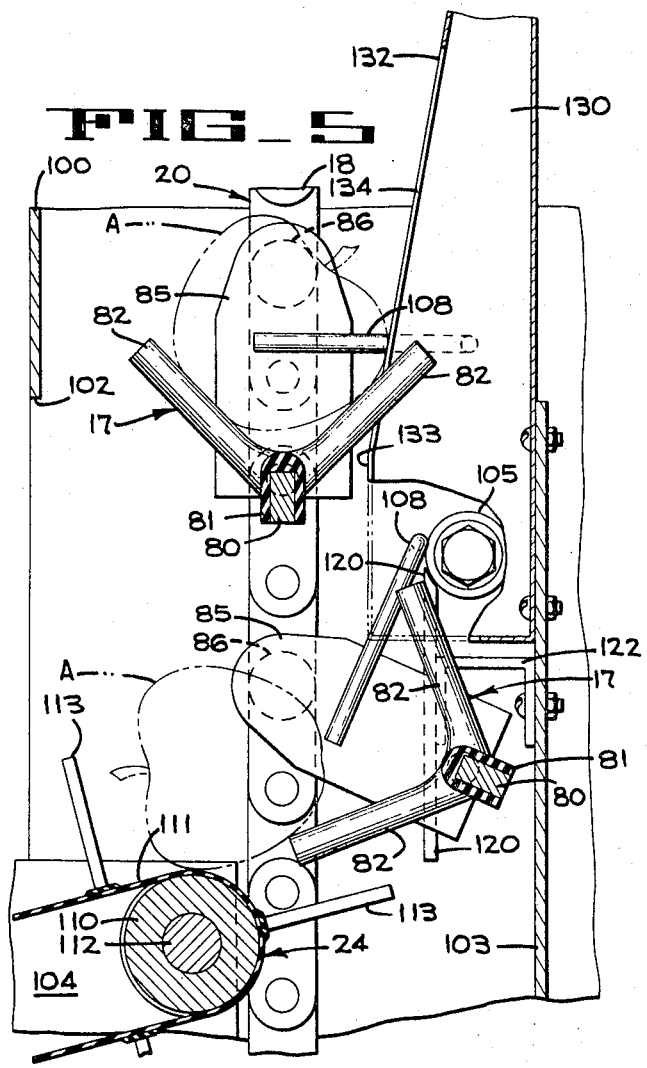
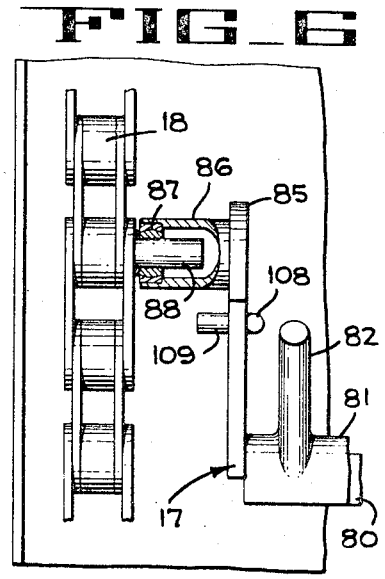
INVENTOR.
JACK A. BRADFORD
BY F. W. Anderson
C. E. Tripp
ATTORNEYS

United States Patent Office 3,452,448
Patented July 1, 1969

3,452,448
APPARATUS FOR DRYING FRUIT
Jack A. Bradford, Yakima, Wash., assignor to FMC Corporation, San Jose, Calif., a corporation of Delaware
Filed Oct. 9, 1967, Ser. No. 673,652
Int. Cl. F26b 25/02, 19/00
U.S. Cl. 34—203                        11 Claims

ABSTRACT OF THE DISCLOSURE

Apples which have been freshly waxed are skin-dried when they are carried through a series of parallel vertical runs in an enclosed, heated chamber by a continuously moving conveyor. The fruit is supported in rows in open carriers formed of a plurality of spaced fingers which carriers are rotatably mounted at their ends so that they will maintain the same position throughout the chamber relative to the horizontal and will not disturb the position of the apples thereon while they are drying.

BACKGROUND OF THE INVENTION

Field of the invention

In general, this invention pertains to that field of art concerned with the methods of and apparatus for skin-drying fruit, and more particularly, it pertains to drying apparatus of the kiln or oven type which are provided with continuously moving conveyors for carrying the fruit therethrough.

Description of the prior art

In recent years the fruit industry, and particularly the apple packing industry, has turned to the waxing of fresh fruit before they are packed in boxes or cartons and sent to the market. Apples which have been waxed have a considerably longer shelf life since shrinkage and quality deterioration is greatly retarded in the waxed apple, and hence the demand for waxed fruit has risen rapidly during the past few years. A problem of drying the apples is presented with an apple-waxing operation, however, since slow-drying water-base waxes must be used on edible fruit such as apples. When apples are waxed, they are first washed to remove field dirt or other foreign matter therefrom, the wax is applied (usually by sprays or brushes or a combination thereof), and then the apples must be dried so that the wax will not be permitted to become scuffed or rubbed off during subsequent handling of the fruit. It is with this latter operation that the present application is directed.

Certain problems have arisen with apparatus which is presently used in drying apples in connection with a waxing operation. For example, a large amount of heat is needed to dry apples since they are normally processed from cold storage, and their temperature is usually between 32° F. and 34° F. when the wax is applied. Although a considerable amount of heat is necessary to skin dry the cold apples, it cannot be applied in too short a time to the apples otherwise heat damage or skin blistering will occur. When heat is applied slowly over a period of time, an excessive amount of floor space is needed, and, since most of the packing plants have not been designed to include the use of the new driers, there is generally only a limited amount of space available.

One method of drying apples consists of a long heated tunnel through which the apples are passed on a conventional horizontal roller conveyor. While this method has the advantage of simplicity and economy in structure it has a distinct disadvantage in that an excessively long tunnel is needed due to the amount of heat required to dry the wax. Consequently, in many packing house installations, the lack of useable floor space prohibits the use of such a heat tunnel. Furthermore, the agitation of the fruit on a roller conveyor has a deleterious effect on the quality of the wax finish.

In another type of installation which has found general use, the apples are escalated after they are waxed upon rollers that are geared to rotate the fruit. Heat lamps are used to dry the fruit in combination with powerful fans which direct air blasts against the apples. This apparatus has generally the same disadvantages as the first-mentioned prior art apparatus in that it requires a considerable amount of floor space and it does not permit the wax to dry without a considerable amount of rubbing and scuffing.

Summary of the invention

The method and apparatus of the present invention overcome the problems existing with the prior art fruit drying devices by utilizing a kiln or heating chamber having a specially designed fruit conveyor therein which carries the fruit in a series of parallel runs whereby a minimum amount of floor space is required. The present apparatus, receives the waxed fruit, gently transfers the same to the conveyor within the heating chamber, conveys the fruit through the chamber without tumbling or scuffing the fruit and yet providing sufficient air circulation, and gently removes the fruit from the heating chamber when it has been skin-dried.

One of the important features of the present invention is the construction of the fruit conveyor which carries the fruit within the enclosed drying chamber. This conveyor includes a plurality of spaced fruit carriers which are formed of a plurality of spaced fingers that permit gentle transfer of the fruit at both the feed and discharge ends of the conveyor and also permit thorough air circulation to the surfaces of the supported fruit. The carriers are freely swingably mounted upon the conveyor so that they will maintain a constant position relative to the horizontal as they are being conveyed even though the conveyor may change its direction of motion; thus, the fruit upon the carriers will not be disturbed as it is dried, and a finer finished product is achieved.

Brief description of the drawings

FIGURE 1 is a diagrammatic central section through the fruit drying apparatus of the present invention.

FIGURE 2 is an enlarged partial section particularly illustrating the feed station of the apparatus shown in FIGURE 1.

FIGURE 3 is a transverse section taken along the lines 3—3 of FIGURE 2.

FIGURE 4 is an enlarged transverse section taken along the lines 4—4 of FIGURE 1 and particularly illustrating the discharge station of the apparatus of the present invention.

FIGURE 5 is an enlarged section taken along the lines 5—5 of FIGURE 4.

FIGURE 6 is an enlarged detail view particularly illustrating the connection of a fruit carrier with a conveyor chain.

DESCRIPTION OF THE PREFERRED EMBODIMENT

The drying apparatus 10 of the present invention is shown in FIGURE 1 as it is used for the drying of apples immediately after a wet wax has been applied to the exterior surfaces thereof. While the apparatus of the present invention is particularly useful where a rapid drying operation is to be effected with minimum disturbance to the fruit, such as after an apple waxing operation, it will be apparent that the apparatus has utility in any system wherein the uniform and rapid skin drying of bulk fruit or vegetables is required. The present application, therefore should not be limited to the drying of any particular fruit, nor should it be limited to use in conjunction with a wet waxing operation.

As seen in FIGURE 1, a continuously moving supply of apples A are passed by an aligned series of rotary brushes 12 beneath wax spray nozzles 13 which, in conjunction with the brushes, apply a liquid wax to the skin of the apples. Waxes which might typically be used for such an operation to protect and enhance the appearance of the fruit are the shellac base water waxes of which several are marketed under various trade names. From the wax applying brushes the apples are passed to a shuffle feed mechanism 15 which functions to form the apples into rows and feed them into elongated fruit carriers 17 that are mounted on and extend between a pair of endless conveyor chains 18 defining a fruit conveyor 20. The conveyor carries the rows of apples through a series of parallel vertical runs in an enclosed drying chamber 22. When the apples have been sufficiently skin dried from their passage through the heated chamber, they are removed from the carriers 17 by a short transfer conveyor 24 which passes the apples to a slotted ramp 26 and onto a grading table conveyor 28 for further processing.

The fruit feeding station and the apparatus for transferring the apples between the wax applicator brushes 12 and the conveyor 20 of the drying apparatus are shown in detail in FIGURE 2. The apples are caused to flow forwardly over the continuously rotating brushes 12 by the pressure of the fruit therebehind and are passed over a stationary ramp 30 to the shuffle feed mechanism 15. Ramp 30 comprises a resilient padding 31, of a material such as sponge rubber, which is covered by a slick Teflon sheet to permit easy passage of the wet apples. The padding is mounted upon a rigid backing plate 32 which is carried by a bracket member 34 that is bolted to side plates 35 between which the apples are arranged to pass (one side plate only being shown in FIG. 2).

The shuffle feed mechanism 15 is mounted upon and extends between the side plates 35 which are, in turn, attached to the front wall 37 of the drying chamber 22 to extend within an opening 38 formed in the lower portion thereof. The shuffle feed mechanism includes a stationary plate 41 which is bolted to the side plates 35 by means of angle irons 42. A pair of channel members 44 and 45 are slidably mounted so as to extend through apertures (not shown) in the plate 41 adjacent each side plate 35. The upper ends of the channel members 44 and 45 are bolted to box-shaped support panels 46 and 47, respectively. The support panels are bolted to angle irons 48 and 49 which are secured together by bolts 50 so that their opposed faces 52 and 53 (FIG. 3) are positioned to slide upon guide blocks 55 of a nonmetallic material having a low coefficient of friction, the guide blocks being set-screwed or otherwise rigidly attached to the side plates 35. The moving upper ends of the support panels 46 and 47 come into propelling engagement with the apples and carry cushioning pads 57 which may be covered with material such as Teflon to protect the fruit. A pair of fixed support panels 60 and 62 of rectangular box-like shape are also attached between the side walls 35 on either side of the movable panel 46. Fixed panels 60 and 62 also carry Teflon-covered, sponge rubber padding 63 on their uppermost faces which come into contact with the fruit. It is noted that the padding on the innermost panel 60 is slotted, as at 64, to permit the vertical passage of the fruit carriers 17 within the drying chamber 22.

The shuffle feed mechanism 15 is continuously driven during operation of the drying apparatus by means of a pair of rotary cam members 70 arranged at each side of the structure (one only being shown in FIG. 2). Each of these cam members is positioned upon a continuously driven shaft 71 so that it will be in pressure engagement with a bearing plate 72 that is carried by a supporting bracket 73 attached to the lower ends of the channel members 44 and 45. Tension springs 75 are connected between the supporting bracket 73 and the fixed plate 41 to urge the slidable channel members 44 and 45 upwardly. As the cams 70 are continuously rotated during operation of the apparatus, the channel members 44 and 45 slide within the fixed plate 41 and thereby carry the fruit propelling support panels 46 and 47 upwardly and downwardly (as indicated by the arrows in FIG. 2) to push the fruit from the delivery ramp 30 to the drying conveyor 20. Due to the limited width of the padding 57 at the upper end of the pushers, the fruit passing over the apparatus will be formed into a single line extending transversely between the side plates 35 by the time that it passes over the innermost support panel 60 so that a uniform line of fruit will be caused to enter the drying chamber and be deposited upon one of the fruit carriers 17.

The carriers 17 which move rows of apples through the drying chamber 22 generally comprise an elongated metallic support bar 80 to which is molded a neoprene cover 81 that includes a plurality of spaced fingers 82 projecting at angles of approximately 45° from the vertical plane of the bar 80. As seen in FIGURE 4, the fingers 82 are spaced far enough apart laterally along the bar so as to provide ample air space therebetween to assure proper drying of all of the apples upon the carrier. The material of the fingers 60, durometer neoprene, is such that they are flexible and will yield slightly when engaged by the apples to prevent damage to the fruit. This factor is very important since bruises which occur during the initial handling of the fruit may severely limit its marketability at a later date.

Welded to each end of the support bar 80 is a flat plate 85 which carries a cylindrical sleeve 86 on its outer face at its upper end (FIG. 6). Sleeve 86 supports a bushing 87 which is freely rotatable upon a projecting pin 88 of the adjacent conveyor chain 18. The conveyor chains 18 are of the conventional chain-link construction with the exception that the pin 88 connecting every fourth link is provided with a projecting extension to rotatably mount the carriers. It is to be noted that the bushing 87 within the mounting sleeve 86 is of the self-aligning type so that a limited amount of canting can occur between the conveyor chain and the fruit carriers 17 to prevent binding when the chain is being propelled about a rigid sprocket. The inner, opposed faces of the plates 85 may be covered with a resilient material, if desired, to prevent damage to the fruit during the transfer operations.

The construction of the drying chamber 22 is shown in FIGURE 1. Each conveyor chain 18 is driven by a drive sprocket 90 (one only being shown in FIG. 1) located below the feed station, and the chain is further rotatably supported by a set of five upper idler sprockets 92 and a set of four lower idler sprockets 93 which permit the chain to be propelled upwardly and downwardly through ten parallel vertical paths in the drying chamber. An idler sprocket 94 below the discharge station at the rear wall 100 of the chamber carries the chain back to the associated drive sprocket 90. Heat is supplied to the chamber by means of two inflow ducts 96 located below the lower set of idler sprockets 93, as indicated by the arrows in FIGURE 1. The inflow ducts are each connected to a blower and heater (not shown) of conventional type. Venting ducts 98 are provided on the upper wall 99 of the drying chamber to exhaust the heated air, as indicated by the arrows, and direct it back to the blowers opposite the inflow ducts 96 to thereby assure the continuous connection flow of heated air through the chamber. A generally U-shaped, transverse wall 103 is provided below the inflow heating ducts 96 to divide the lowermost portion of the chamber from the heated portion of the chamber to prevent the excess loss of heated air at the feed and discharge stations.

As pointed out hereinbefore, the carriers 17 are rotatably mounted by the bushings 87 upon the pins 88 so that they will move about the idler rollers 92 without changing their position relative to the horizontal, i.e., in Ferris wheel fashion. This feature is an especially important one since it is imperative that the apples receive as little jostling as possible during the drying process so that the wet wax will not become scuffed or rubbed off of the surface of the apple. It can be seen that the carriers of the present invention will not disturb the initial position of the apples as they pass through the heating chamber, while at the same time allowing a maximum amount of air to reach them since the apples are supported only upon the neoprene base at the upper edge of the thin support bar 80 and by the extending fingers 82.

The discharge station is shown in FIGURES 4 and 5 of the drawings. An opening 102 is provided in the rear wall 100 of the drying chamber at the lower edge thereof, and the transfer conveyor 24 is mounted so as to extend within the opening by means of bearing plates 104 that are attached to the side panels of the chamber. Each carrier 17 is tilted outwardly as it moves past the transfer conveyor 24 so that the apples thereon will tend to gravitate onto the transfer conveyor. In order to tilt the carriers at the proper moment, i.e., when they are just above the transfer conveyor, a roller bearing 105 is mounted upon a shaft 106 that is attached to one of the side walls of the chamber. The roller 105 is positioned so as to be in vertical alignment with a horizontal rod 108 carried by each of the flat plates 85 of the carriers 17 at the side of the conveyor adjacent the roller. Rods 108 have short hook portions 109 at their outer ends which engage the cylindrical surface of the roller as the carriers descend and cause the support bars 80 of the carriers to swing inwardly as they move past the transfer conveyor.

The transfer conveyor 24 includes a pair of pulleys 110 and an endless belt 111 which is trained about the pulleys and supports a series of rows of spaced fingers 113 of resilient material extending upwardly from the face of the belt. The pulleys 110 are carried by shafts 112 which are journalled in the bearing plates 104. The fingers 113 which extend outwardly from the belt are arranged to pass between the fingers 82 of the tilted carriers (as best shown in FIG. 4) to comb the apples from the carrier if they have not gravitated onto the transfer conveyor. The fingers 113 on the transfer conveyor are particularly useful when the drying apparatus is operated at high speeds since there is a distinct problem in providing enough time for the apples to gravitate off of the carrier fingers 82, with some of the apples tending to stick; with the interlaced finger arrangement, it can be seen that a positive transfer is assured. The timing between the transfer conveyor and the fruit carrier conveyor 20 is such that each set of fingers 113 will pass the downwardly and outwardly projecting fingers 82 of a tilted carrier 17 at the proper moment to assure a positive transfer of the fruit. Located below the roller 105 is a bar 120 which extends in a vertical line below the outermost edge of the roller so as to prevent the carrier from swinging back into its normal position before it clears the transfer conveyor. The bar 120 is mounted by bracket 122 to the upstanding face of the divider wall 103 within the drying chamber.

Also secured to the upstanding face of divider wall 103 is a fruit camming member 130 which is positioned to extend adjacent the carriers across the face of the discharge station (FIG. 4). Camming member 130 includes an upper section 132 having a tapered, downwardly diverging shape and a lower, generally vertical section 133. The outer faces of both sections are projected with wide slots 134 (FIG. 4) to permit the passage of the fingers 82 on the carriers 17. The outer face of the tapered section 132 causes apples which may be resting against the innermost fingers 82 of the carriers to be pushed forward and upwardly on the outermost fingers of the carrier. This action also assures a proper discharge of the fruit from the carriers by placing the fruit in a position for a quick discharge and easy pickup by the fingers 113 of the transfer conveyor and thereby permits the apparatus to be operated at high speeds.

The transfer conveyor 24 propels the spaced rows of apples down a slight incline and deposits them onto the inclined ramp 26 which is provided with upwardly extending slots 140 to permit the passage of the fingers 113. The ramp 26 is mounted to the bearing plates 104 and extends to a position overlying the grading table conveyor so that the fruit will roll thereon. Fruit which is received upon the grading table conveyor is carried to the grading and/or packing stations (not shown) where it is graded and/or packed into boxes, cartons, bags or other suitable containers for transportation to the marketplace.

The various aforedescribed mechanisms of the present invention are all driven by means of a motor M (FIG. 1) which drives a chain 150 which is operatively connected with a drive shaft 152 supporting the drive sprockets 90. A separate drive chain 154 is connected between the motor and the drive shaft 71 carrying the cams 70 to operate the shuffle feed mechanism 15. A further drive chain 156 is connected between the shaft 158 supporting the idler sprockets 94 and one of the shafts 112 supporting the pulleys for the transfer conveyor 24. As mentioned hereinbefore, both the shuffle feed mechanism 15 and the transfer conveyor 24 are operated at precisely timed speeds relative to the linear speed of the conveyor 20 so that one row of fruit will be pushed onto and removed from each carrier 17 during operation of the apparatus.

From the foregoing description it will be apparent that the present invention provides a drying apparatus which utilizes a minimum amount of floor space to dry wet waxed apples since a plurality of closely spaced, parallel runs are utilized by the conveyor. Since the fruit carriers are mounted in Ferris wheel fashion upon the conveyor, the apples are not unduly disturbed as they are shifted through the conveyor runs, and the wet wax will be allowed to dry evenly and properly.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. Apparatus for drying fresh fruit comprising means for receiving fruit randomly, arranging said fruit into uniformly spaced rows, and feeding said rows of fruit at timed intervals; first conveying means for gently receiving said rows of fruit from said feeding means and for conveying said fruit through a series of parallel runs without disturbing the initial orientation of said fruit relative to the horizontal; means for applying heat to said fruit while it is being carried by said first conveying means; and discharge means for gently receiving said rows of fruit from said first conveying means and for transferring said fruit to a second conveying means for further processing, said first conveying means comprising a plurality of spaced fruit carriers and a pair of parallel endless conveyor chains for supporting said carriers, means for rotatably mounting the ends of each of said carriers to said chains so that the carriers will maintain a constant horizontal orientation while they are supporting said fruit, said fruit carriers being formed with a narrow lower section extending transversely between said conveyor chains and a plurality of spaced flexible fingers extending upwardly and outwardly of said lower section to engage said fruit while permitting sufficient air circulation to permit drying of the fruit.

2. Apparatus for drying fresh fruit as set forth in claim 1 wherein said heat applying means comprises a chamber enclosing said first conveying means, and means for continuously circulating heated air through said chamber.

3. Apparatus for drying fresh fruit as set forth in claim 1 wherein said means for feeding said rows of fruit comprises a mechanism operative to push a row of fruit to a position where the individual fruits may gravitate into one of said fruit carriers.

4. Apparatus for drying fresh fruit as set forth in claim 1 including cam means positioned adjacent to said discharge means in the path of said carriers for causing each of said carriers to tilt to permit the rows of fruit carried thereby to gravitate onto said discharge means.

5. Apparatus for drying fresh fruit as set forth in claim 4 wherein said discharge means comprises a transfer conveyor having a plurality of spaced rows of upstanding fingers mounted thereon, said transfer conveyor being mounted so that a row of fingers thereon will extend between the outwardly extending fingers of one of said fruit carriers when said fruit carrier is tilted to discharge fruit therefrom, and means for driving said transfer conveyor so that successive rows of fingers thereon will pass through the extending rows of fingers of successive carriers to asure the proper discharge of all of the fruit carried by said first conveying means.

6. Apparatus for drying fresh fruit as set forth in claim 4 including rods mounted upon and extending outwardly of said carriers, and wherein said cam means comprises a roller mounted so as to intersect the path of said rods at their outer ends.

7. Apparatus for drying fresh fruit as set forth in claim 4 including means fixedly mounted adjacent said discharge means for forcing the fruit on said carriers upwardly and outwardly on said fingers just prior to the tilting of the carriers to place the fruit in the proper position for a quick discharge.

8. A fruit carrying conveyor comprising a pair of aligned endless conveyor chains, a plurality of spaced fruit carriers extending between said chains, means for rotatably mounting the ends of said carriers to said chains so that said carriers will maintain a constant position relative to the horizontal when said chains are shifted in direction, said carriers being of trough-like shape and being provided with a plurality of upwardly and outwardly extending spaced fingers of resilient material for supporting said fruit.

9. A fruit carrying conveyor as set forth in claim 8 including abutment means mounted upon said carriers for engagement with a camming device to cause the carriers to tilt relative to the horizontal to discharge the fruit therefrom.

10. A fruit conveying system comprising an endless main conveyor having horizontal flights of trough-like shape pivotally mounted at their opposite ends along the length of the conveyor, means for normally positioning said troughs so that they open upwardly, said troughs being defined by upwardly and outwardly extending fingers, said main conveyor having a downwardly moving discharge run, an endless discharge conveyor leading downwardly and outwardly and away from a discharge zone of said main conveyor, a plurality of spaced fingers on said discharge conveyor interdigitating with the outermost set of fingers on said troughs for gently nudging fruit clear of said troughs, and means for tilting said troughs toward said discharge conveyor at said discharge zone.

11. A fruit conveying system as set forth in claim 10 including a plurality of spaced members mounted to interdigitate with the innermost set of fingers on said troughs at said discharge zone to force the fruit on said troughs outwardly on said outermost set of fingers and thereby place the fruit in the proper position for discharge just prior to the tilting of the troughs.

References Cited

UNITED STATES PATENTS

| 1,093,011 | 4/1914 | Roberts | 198—148 |
| 1,339,092 | 5/1920 | Benjamin | 34—204 XR |
| 3,146,730 | 9/1964 | White | 198—155 |
| 3,186,534 | 6/1965 | Harte | 198—156 |

KENNETH W. SPRAGUE, *Primary Examiner.*